United States Patent [19]

Peterson et al.

[11] Patent Number: 4,720,075
[45] Date of Patent: Jan. 19, 1988

[54] SHOCK ISOLATING MOUNT

[75] Inventors: Francis C. Peterson, Woodbury; Lorenzo Perosino, Waterbury; Robert Despins, Madison, all of Conn.

[73] Assignee: Buell Industries, Inc., Waterbury, Conn.

[21] Appl. No.: 890,905

[22] Filed: Jul. 28, 1986

[51] Int. Cl.[4] .............................. F16M 13/00
[52] U.S. Cl. ................... 248/635; 248/634; 267/292; 296/35.1
[58] Field of Search ............... 248/635, 634, 560, 638, 248/632; 296/35.1; 267/63 R, 63 A, 141.1, 153; 180/89.12; 403/390

[56] References Cited

U.S. PATENT DOCUMENTS

| | | | |
|---|---|---|---|
| 2,144,170 | 1/1939 | Utz et al. | 296/35.1 |
| 2,520,757 | 8/1950 | Cain | 248/632 |
| 2,708,560 | 5/1955 | Paley | 248/632 X |
| 3,128,999 | 4/1964 | Schmitt | 267/153 |
| 4,014,588 | 3/1977 | Kohriyama | 296/35.1 |
| 4,286,777 | 9/1981 | Brown | 296/35.1 X |
| 4,513,990 | 4/1985 | Morita et al. | 267/63 R X |

FOREIGN PATENT DOCUMENTS 0586608 3/1947 United Kingdom ............. 267/141.3

Primary Examiner—Ramon O. Ramirez
Attorney, Agent, or Firm—St. Onge Steward Johnston & Reens

[57] ABSTRACT

An improved shock isolating mount is designed for securing a body part of a vehicle to a support. The shock mount comprises a two-part spool that includes: a spacer formed from an annular flange integral with a tube, the tube projecting through apertures in mating elastically resilient bodies and a mounting part of a vehicle body part disposed between them; a thimble, formed from a flange integral with a tube designed such that the thimble tube can telescope into the spacer tube. The thimble tube is formed into a polygon shape at the tube shoulder adjacent the thimble flange and the spacer tube is formed in a matching polygon shape such that the thimble tube shoulder can mate with the spacer tube. The thimble tube has an enlarged end which is engaged by a plurality of inward protrusions mounted in the spacer tube to prevent the spacer and thimble assembly from accidental disengagement. The thimble tube is internally threaded to engage a threaded fastener inserted through the support, through the spool tube, and into the thimble tube. When tightened, the fastener draws the flanges of the spacer and thimble together to simultaneously securely clamp the mounting part of the vehicle body and secure the shock mount and the mounting part to the vehicle frame.

9 Claims, 3 Drawing Figures

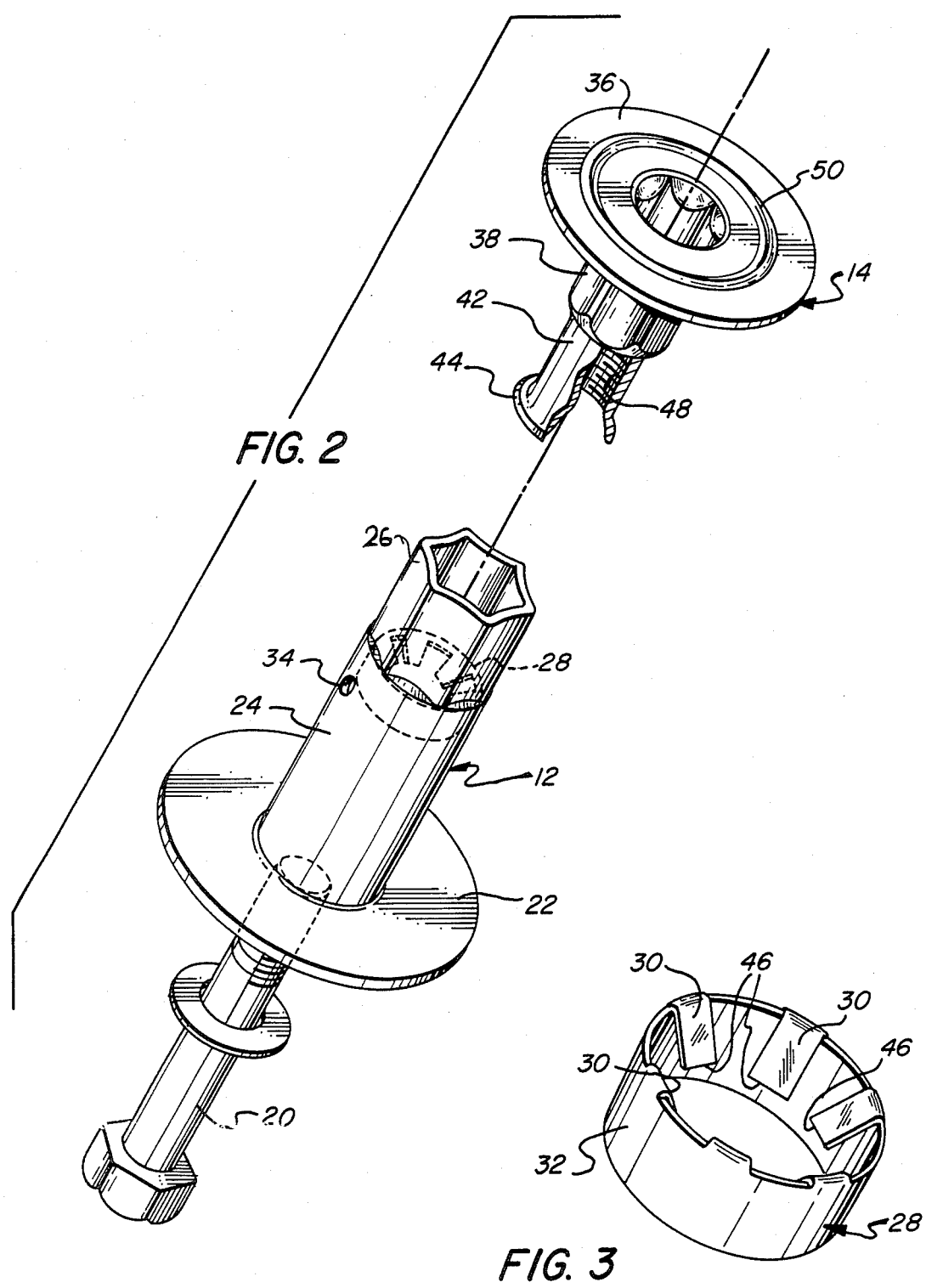

SHOCK ISOLATING MOUNT

BACKGROUND OF THE INVENTION

1. Field of the Invention

The present invention relates to an improved assembly, referred to as a shock mount, for securing part of a heavy structure, such as a vehicle body, to a support, such as the frame of the vehicle, and absorbing vibrations or shocks between the two structures.

2. Description of the Prior Art

A well known shock isolating mount currently used in the automotive industry for securing and supporting the body or cab of a vehicle on its frame comprises two mating rings of elastically resilient material between which a body mounting part such as an ear protruding from the vehicle is engaged and clamped by a two-part spool that is seated on the vehicle frame and fixed to it by a threaded fastener. The spool parts have flanges which bear against the opposite sides of the mating rings and are threaded together so that by turning one spool part relative to the other the elastic rings and the body mounting part between them are clamped tightly between the flanges. One of the spool parts is a tubular spacer having an annular flange integral with a deep drawn tube that is internally left hand threaded. The other spool part is a thimble having an annular flange integral with a deep drawn tube that is externally left-hand threaded to fit inside and engage its thread with the screw thread of the tubular spacer. A torque nut is welded to the flange face opposite the thimble tube. The torque nut is right hand threaded.

This known shock mount is assembled by inserting the spacer tube through the center of the mating elastic rings and the body mounting part positioned between them, placing the end of the thimble tube in the end of the spacer tube, and turning the thimble to thread it into the spacer tube and clamp the elastic rings tightly together on the body mounting part. Then, the spool assembly and body part is seated in place on the vehicle frame, and the threaded fastener is passed up through an opening in the frame, through the tubes and the assembled spool parts, and is threaded into the nut welded onto the thimble until the entire assembly is fixed securely to the frame.

It has been found that several practical drawbacks impede effective fastening by the prior art assembly.

During production line assembly of the spool parts crossing and jamming of the left-hand thread can and sometimes does occur, preventing the assembly from clamping together properly. An additional drawback of the known assembly becomes apparent if cross-threading of the threaded fastener and the welded nut occurs, because torque applied to the fastener in an attempt to unscrew the threaded fastener can instead cause the left-hand threaded thimble to unscrew from the spacer, jamming the entire assembly so that the unit must be cut off. In addition, it is difficult to get a good thread when manufacturing the tube components. It is also difficult to weld the torque nut onto the spindle flange so that it is properly centered.

SUMMARY OF THE INVENTION

It is the object of the present invention to provide an improved shock mount which avoids the shortcomings of the known shock mount. More particularly, the present invention provides an improved shock mount structure that eliminates the need for left-hand tube threading for assembling the spacer and thimble assembly, and can be more easily assembled than the known shock mount. The present invention further eliminates the need to weld a nut to thimble component of the spool.

It is a further object of the present invention to provide a shock mount combination making use of a spacer and a telescoping thimble for clamping together elastically resilient rings between which is disposed a mounting part of a vehicle body in which a single fastening device serves the dual functions of drawing the parts of the shock mount together and securing the shock mount assembly to a vehicle frame.

The shock mount in accordance with the present invention includes a two-part spool comprising a spacer and a thimble. The spacer includes an annular flange and integral tube projecting perpendicularly from the flange. The spacer tube is inserted through apertures in mating elastically resilient rings and the mounting part of a vehicle body disposed between the resilient rings.

The thimble includes an annular flange and integral tube projecting perpendicularly from the flange. The thimble tube is receivable inside and displaceable axially relative to the spacer tube, such that the spacer and thimble can telescope together. The thimble tube is engaged by an elongate fastening device which has a head and shank. The shank portion of the elongate fastening device is inserted through an opening in the support, up through the center of the spacer tube, and into the engaging means of the thimble tube. Manipulation of the fastening device draws the thimble tube into the spacer tube and thereby causes the flanges of the spacer and thimble members to compress the mating elastically resilient rings and the body part disposed between the rings, and simultaneously secures the shock mount to a support disposed between the spacer flange and the head portion of the elongate fastener. The elongate fastening device will usually comprise a screw threaded fastener, such as a carriage bolt, and will be engaged by screw threading tapped on the inside of the thimble tube.

The spacer tube is formed at its axial end opposite the spacer flange into a polygon, as viewed in cross-section. The thimble tube is formed at the tube shoulder adjacent the thimble flange into a complementary polygonal shape, so that the thimble polygon formation can be received in the spacer polygon formation, preventing rotation of the two members relative to each other.

The two-part spool further includes coacting means for preventing separation of the spacer and thimble members when the thimble tube is received in the spacer tube. The coacting means may be formed from a plurality of inward protrusions inside the spacer tube which engages an enlarged end on the thimble tube.

The shock mount is assembled by inserting the spacer tube through the center of the mating elastically resilient rings and the body mounting part positioned between them, placing the end of the thimble tube into the spacer tube and applying sufficient force for the thimble tube enlarged end to be engaged by the spacer tube inward protrusions. The body part and assembled spool and mating rings is then seated in place on the support, and the threaded fastener is passed up through an opening in the support, through and coaxially with the center of the spool parts and is engaged by the internal threading of the thimble. The threaded fastener is tightened, drawing the thimble flange towards the support, causing the spool parts to telescope together so that the spool flanges compress the resilient rings against the body part so that the body part is secured, and also securing the spool and mating ring assembly and associated body part to the support.

When the threaded fastener is tightened and the isolator assembly firmly secured the clamping load is borne by the spacer tube and the resilient rings. The spool and thimble telescope together, to maintain an even distribution of the clamping load.

The design of the spacer tube polygon shape portion 10 and matching thimble tube polygon shoulder prevents independent rotation by the either part relative to the other. This design eliminates the need for a left-hand threaded spacer and thimble, thus eliminating the problems of jamming of the assembly associated with the cross-threading of the components of the prior art assembly. Accidental disassembly of the spacer and thimble is prevented by the locking effect of the thimble tube enlarged end engaged by the plurality of inward protrusions on the spacer tube.

Manufacture of the components is simplified by the design of the improved shock mount, since the need for manufacturing a spacer and thimble with large areas of coarse left-hand thread is eliminated. Instead, a simple polygonal shape is impressed on the spacer and thimble tube radial surfaces. Also, it is no longer necessary to include a welding step in the manufacture of the spool assembly because the welded torque nut on the thimble of the prior art assembly is eliminated. The thimble tube is instead internally tapped to receive the threaded fastener. In addition, the threaded fastener used to secure the assembly may be of shorter length than that employed by the prior art, thus creating additional savings in materials.

Therefore, the improved isolator assembly of the present invention represents a substantial improvement over prior art devices because it provides a greater ease of assembly and consequent greater reliability than previously achieved with prior art designs.

Other objects, aspects and features of the present invention in addition to those mentioned above will be pointed out in or will be understood from the following detailed description provided in conjunction with the accompanying drawings.

BRIEF DESCRIPTION OF THE DRAWINGS

FIG. 2 is a perspective view of the spacer and thimble components oriented for assembly.

FIG. 3 is a perspective view of an embodiment of the plurality of inward protrusions.

DETAILED DESCRIPTION OF THE PREFERRED EMBODIMENTS

Figure 1:
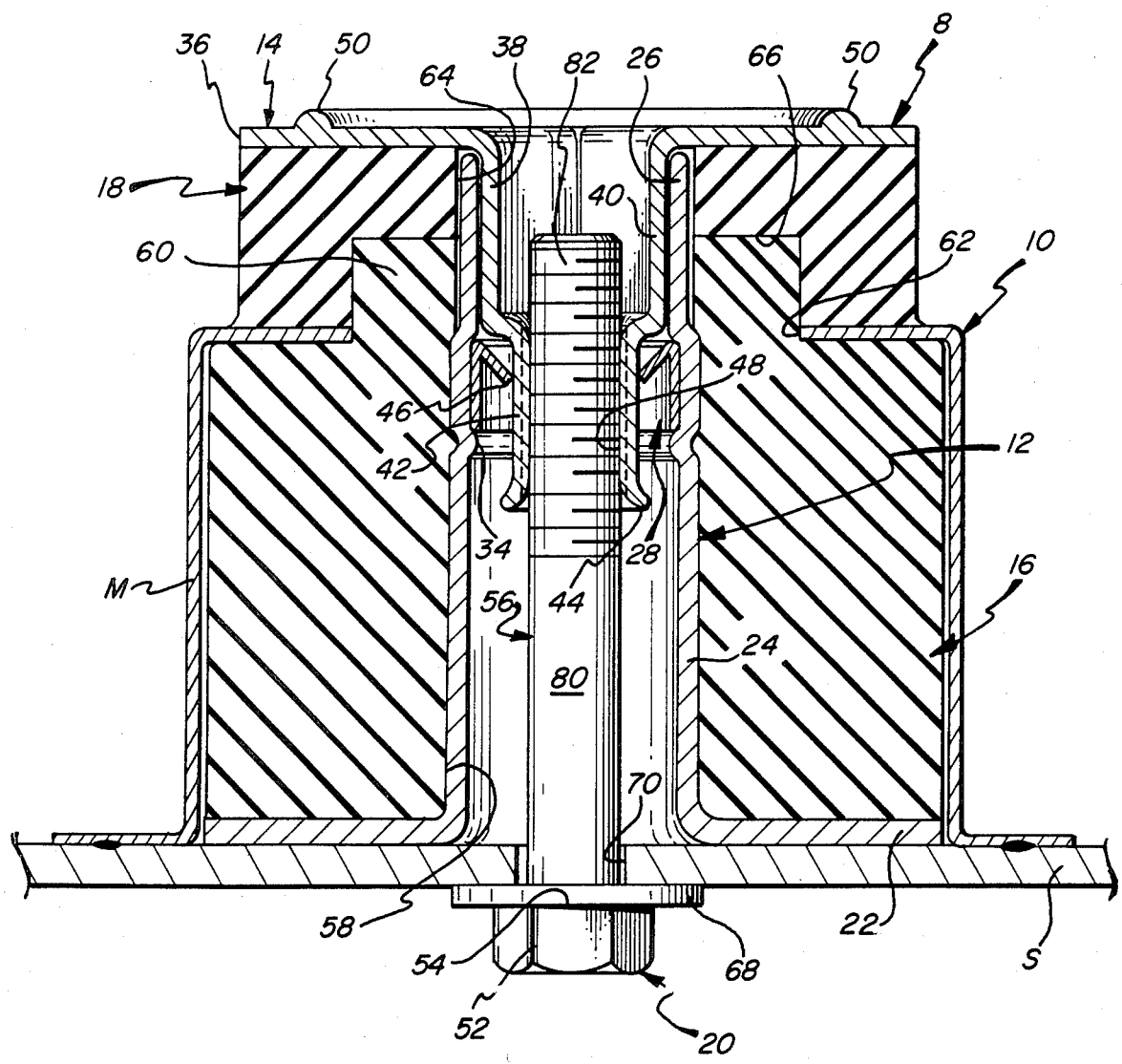
FIG. 1 is a vertical cross-sectional view of the assembled shock isolating mount.

As shown in FIGS. 1, 2, and 3 the isolator assembly of the present invention, generally indicated at 10, comprises a two-part spool, generally indicated 8, which includes a spacer, generally indicated at 12, a thimble, generally indicated at 14, a first elastically resilient mating ring, generally indicated at 16, a second elastically resilient mating ring, generally indicated at 18, and a threaded fastener, generally indicated at 20. In the preferred embodiment, the spacer 12, shwon in FIGS. 1 and 2, includes an annular flange 22 integral with a tube 24 extending perpendicularly from the flange 22. Spacer tube 24 for a portion of its axial end opposite the spacer flange 22 is formed into a polygon when viewed in axial cross-section, shown as a hexagon portion 26. The spacer tube further includes a plurality of inward protrusions which is shown as a six tab washer 28. The plurality of inward protrusions is further shown in FIG. 3 as a six tab washer which has tabs 30 bent to an angle approximately 45 degrees from the washer body 32, such that when positioned in the spacer tube, the tabs are generally oriented towards the spacer flange 22. The six tab washer 28 is held in place at the spacer tube end 26 opposite the spacer flange 22 by the constriction of the tube caused by forming a portion of the tube end into a hexagon 26. The six tab washer is held in place at the spacer flange end by two indents 34 in the sapcer tube wall.

Inserted into the spacer 12 is the thimble 14. The thimble includes an annular thimble flange 36 integral with a thimble tube 38. The thimble flange is formed, in the preferred embodiment, with a raised ring 50 located on the axial face opposite the thimble tube 38. The thimble tube 38 has two distinct portions 40 and 42. The tube shoulder portion 40 located between the thimble flange 36 and tube cylindrical portion 42 is formed into polygon shape when viewed in axial cross-section, which in the preferred embodiment is a hexagon. The hexagon shoulder 40 is congruent with shape of the spacer tube portion 26, but has a perimeter slightly less than the perimeter of the interior of the hexagon portion 26. The thimble tube hexagonal shoulder 40 may thus be fitted into the spacer tube hexagonal portion 26, such that each piece engages the other, and neither the spacer nor the thimble will rotate relative to each other.

The thimble is further formed with a tube cylindrical portion 42 extending beyond the hexagonal shoulder portion 40. The thimble tube cylindrical portion has an outer diameter which is less than the outer diameter of the thimble tube hexagonal shoulder.

The outer diameter of thimble tube cylindrical portion is less than or equal to the diameter of the circle described by the tips 46 of the tabs of the six tab washer 28. The thimble tube cylindrical portion has an axial length such that when the thimble is inserted into the spacer the cylindrical portion extends beyond the tips 46 of the tabs of the six tooth washer 28. The cylindrical portion of the thimble tube has an enlarged end 44. When the thimble tube 38 is inserted into the spacer tube 24 the thimble tube enlarged end 44 is engaged by the six tab washer 28. The washer tabs 30 are bent away from the spacer tube 24 walls at an angle of approximately 45 degrees to allow the thimble tube flared end 44 to be easily pressed into the six tab washer 28. The washer is made from a resilient material, such as spring steel or plastic, so that the tabs 30 will bend further inwards when the thimble tube enlarged end 44 passes through the circle described by the tips of the six tabs washer 46, yet will return to their original inclination after the thimble tube flared end 44 has been received by the six tab washer 28. Once inserted, the thimble 14 is prevented from accidental disengagement from the spool 12 by the six tab washer 28 engaging the enlarged end 44.

While the plurality of inward protrusions is described and illustrated as a six tab washer 28, any other method of providing a series of gripping or restraining tabs or surfaces that will allows the easy insertion of the thimble tube 38 into the spacer tube 24 and will lock the thimble tube in place to prevent inadvertent disassembly may be provided. For example, a rubber O-ring could be mounted within the spacer tube 24 to yield a frictional locking effect.

The thimble tube cylindrical portion is further formed with internal threading 48. Internal threading 48 is designed to be tapped into or otherwise engaged by threaded fastener 20. The threaded fastener 20 includes a head 52 configured to be engaged by a tool for applying torque about the fastener axis. For example, the head may be slotted to receive a flat or phillips head screwdriver or may be formed as shown with a hexagonal shape in plan view to provide wrench flats for receiving a wrench. The head 52 is formed with a load bearing surface 54 that extends generally perpendicularly from the fastener axis. The fastener further includes a shank, generally indicated at 56 that extends perpendicularly from the load bearing surface 54 and includes a cylindrical, unthreaded portion 80 and a threaded portion 82 that extends coaxially with the unthreaded portion 80. The threaded portion 82 is adapted to be received by the thimble tube internal threading 48.

The elastically resilient mating rings 16 and 18 are formed from a durable shock absorbing material such as rubber or other polymeric compounds. When the entire isolator is assembled the resilient rings serve to insulate the body part M from the transmission of vibrational shocks from the support S. In the preferred embodiment the first resilient ring 16 is a round cylinder with an outer diameter equal to the diameter of the spacer flange 22. The first resilient ring has a hole 58 that is centered in the first resilient ring. The hole 58 has a diameter equal tot he outer diameter of the spacer tube 24. Accordingly, the first resilient ring may be fitted onto spacer tube 24. The first resilient ring 16 further includes a projecting portion 60 formed as a oblong cylinder. The maximum diameter of the projecting protion 60 is less than the diameter of the thimble flange 36. The projecting portion 60 of the first resilient ring is intended to be received by an opening 62 in the body mounting part M. The body mounting part opening 62 therefore must be cut or punched out in the same shape as oblong projecting portion of the first resilient ring. The mounting part hole 62 should be slightly larger in size than the projecting portion 60.

The second elastically resilient ring 18 is also formed as a round cylinder, and has a diameter equal to the diameter of the thimble flange 36. The second resilient ring has a hole 64 that is centered in the second resilient ring. The hole 64 has a diameter equal to the outer diameter of spacer tube 24, and is the same as the diameter of the hole 58 in the first resilient ring. The second resilient ring 18 has at one axial end an oblong cylindrical cavity 66 which receives the first resilient ring projecting portion 60. The cavity 66 should be slightly larger than the projecting portion 60, and should be of the same geometric shape as the projecting portion 60.

The oblong cylindrical projecting portion 60 and the associated body mounting part hole 62 and cavity 66 operate to prevent rotation by the resilient rings relative to the body part and relative to each other. The spool 8 is prevented from rotation relative to the two resilient rings 16 and 18, as well as rotation relative to the body part M by friction between the spacer tube 24 and the first resilient ring hole 58. The thimble 14, being unable to rotate independently from the spacer 12 because of the engagement of the thimble tube hexagonal shoulder 40 and the spacer tube hexagonal portion 26, is similarly prevented from rotation relative to the annular clamping members 16 and 18 and the body part M.

In the assembled configuration, as seen in FIG. 1, the spacer 12 rests on the support S. The first resilient ring 16 is mounted on the spacer 12. The body mounting part M is seated on first mating ring 16 and the second resilient ring 18 the and thimble 14 are then mounted over the body part. The entire assembly is secured by the threaded fastener 20. The threaded fastener 20 is inserted through a washer 68 and an opening 70 in the support S up through the center of and coaxially with spacer tube 24. The threaded fastener 20 engages the thimble tube internal threading 48 and when tightened, provides a reliable and secure isolator and fastening assembly.

The unique design and assembly of the components of the present invention enhance the economy and reliability of assembly since the spacer and thimble assembly may be easily aligned and engaged. The assembled shock mount assures secure clamping of the body part because of the telescoping design of the spacer and thimble. The problem of cross-threading and consequent jamming of the spool and thimble of the prior art devices is eliminated.

In addition, the present invention enhances the economy with which the component parts may be made. The manufacturing steps of cutting left-hand thread on a spool, and welding a torque nut on a thimble flange are eliminated.

What is claimed is:

1. An assembly for securing a mountign part of a structure onto a support, comprising:
   a rigid spacer member having a spacer flange and a spacer tube integral with the spacer flange and projecting from said spacer flange to extend through apertures in mating bodies and said mounting part disposed between said bodies;
   a rigid thimble member having a thimble flange and a thimble tube integral with the thimble flange and projecting from said thimble flange, said thimble tube being receivable inside and displaceable axially relative to said spacer tube, said thimble member and said spacer member having mutually engaging means for limiting rotation of either of them relative to the other;
   an elongate fastening device having a shank to extend through said spacer tube, a head portion disposed outside said spacer member and a support disposed between said spacer flange and said head portion, and an end portion, said end portion and said thimble tube having cooperating means operable by manipulation of said fastening device to draw said thimble tube into said spacer tube and thereby draw said spacer and thimble flanges together and against said bodies, securely clamping said bodies and said mounting part between said flanges, and to secure said assembly and said mounting part to said support.

2. The assembly of claim 1, where said mutual engaging means comprises mutually fitting polygonal formations on said spacer and spindle tubes.

3. The assembly of claim 2, where said polygonal formations are hexagonal.

4. The assembly of claim 1, further comprising means on the inside of said spacer member for engaging an end portion of said thimble member and resisting separation of said members when said thimble tube is received in said spacer tube.

5. The assembly of claim 4, where said engaging means comprises a plurality of inward protrusions inside said spacer tube and said end portion of said spindle tube is enlarged.

6. The assembly of claim 1, said cooperating means comprising matching screw threads formed respectively on the outside of said shank end portion and on the inside of said spindle tube.

7. A shock isolating mount for securing a mounting part of a heavy structure a support, comprising:

a spacer including a flange and tube, said spacer tube projecting from said spacer flange and through apertures in mating elastically resilient bodies and said mounting part disposed between said bodies; said spacer tube being formed at a portion of its axial end opposite said spacer flange into a hexagon shape; and the internal radius of said tube having a plurality of inward protrusions;

a thimble including a flange and tube, said thimble tube projecting from said thimble flange and being formed for a portion of its axial end adjacent said thimble flange into a hexagon shape, said thimble tube being receivable within said spacer tube; said thimble tube portion adjacent said thimble tube hexagonal portion being into formed a cylinder, said thimble tube cylinder portion being enlarged at its axial end opposite said thimble flange, said enlarged end being engaged by said plurality of inward protrusions when said thimble tube is received in said spacer tube; said thimble tube being internally threaded; and a threaded fastener inserted through an opening in said support and projecting coaxially and centered within said spool tube and engaging said internally threaded portion of said thimble tube to simultaneously clamp said resilient bodies to said mounting part and to secure said shock mount and associated mounting part to said support.

8. The isolator assembly of claim 7 where said plurality of inward protrusions comprises a six tab washer.

9. In a shock mount for clamping together elastically resilient bodies and holding a part placed between them, a spool device comprising:

a rigid spacer member including an annular flange integral with a spacer tube projecting from an inner side of said flange, said spacer tube having a polygonal cross section at one end thereof;

a rigid thimble member including an annular flange integral with a projecting thimble tube, said thimble tube having a polygonal cross section and fitting and being displaceable axially inside said spacer tube and prevented from rotation relative to said spacer tube by said polygonal interfitting cross sections, and having an internally screw-threaded end portion to receive a threaded fastener extended into said thimble end portion through said spacer tube; and means formed on the inside of said spacer tube for engaging an end portion of said thimble member and resisting separation of said members when said thimble tube is received in said spacer tube.

* * * * *